Figures 1, 2:
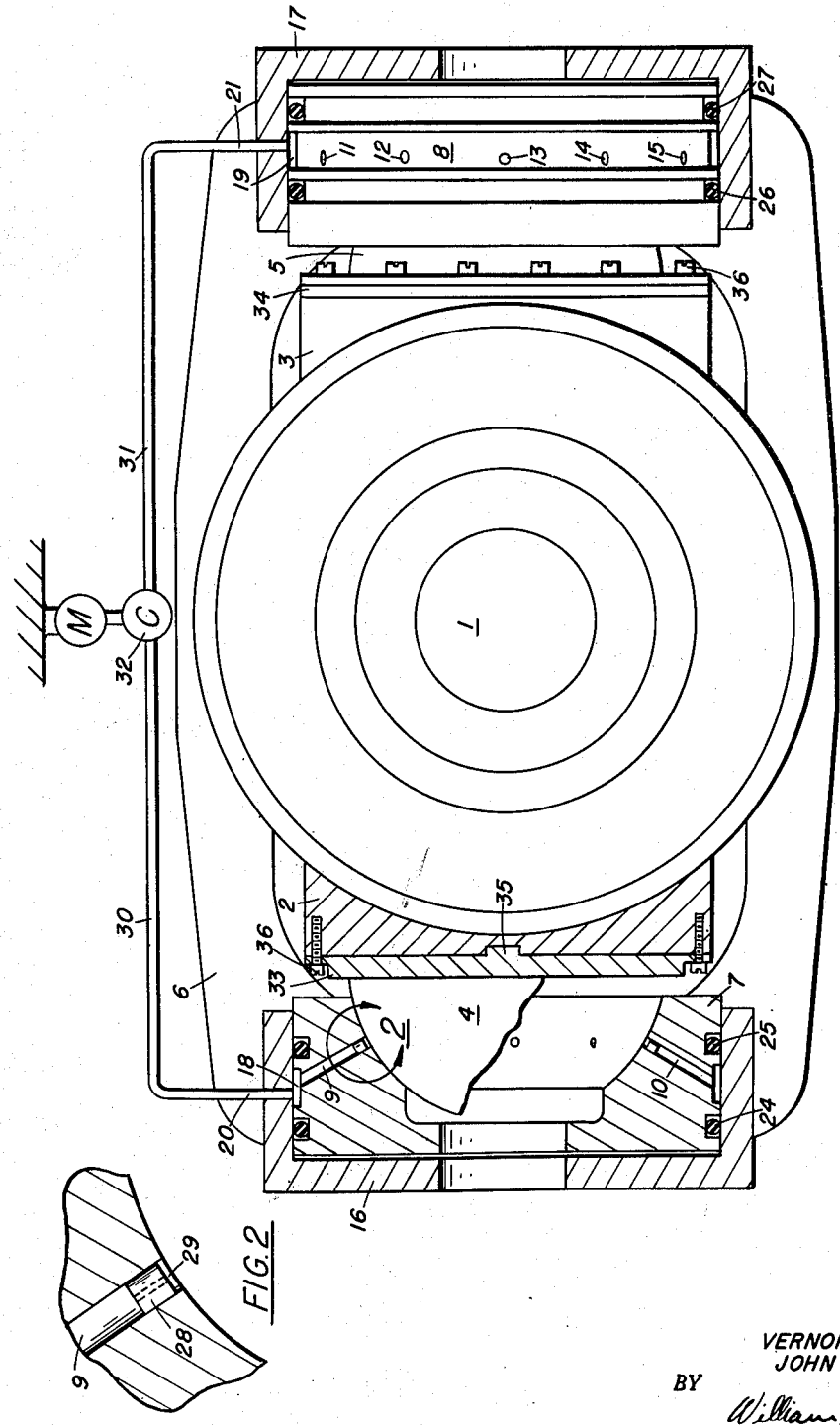

Nov. 11, 1952 V. A. TAUSCHER ET AL 2,617,695
ZONAL BALL AIR BEARING
Filed April 10, 1950

INVENTORS
VERNON A. TAUSCHER
JOHN M. SLATER
BY
William R. Lane
ATTORNEY

Patented Nov. 11, 1952

2,617,695

UNITED STATES PATENT OFFICE 2,617,695

ZONAL BALL AIR BEARING

Vernon A. Tauscher, Los Angeles, and John M. Slater, Inglewood, Calif., assignors to North American Aviation, Inc.

Application April 10, 1950, Serial No. 154,902

5 Claims. (Cl. 308—9)

This invention pertains to air bearings and particularly to an air bearing adapted to support a mass for a single degree of angular freedom. The invention is particularly suited to supporting a gyroscope, but it may also be used for supporting any other device which requires a single degree of angular freedom and a minimum of friction.

In supporting a gyroscope for use in guidance or navigational equipment one of the major problems is that of supporting the gyroscope rigidly against translation while allowing unlimited freedom for rotation about a single axis. The support against translation must, where the gyroscope is to be used under conditions of variable acceleration, be extremely rigid. Likewise, if the gyroscope is to be of value, the bearings which furnish the angular freedom must be substantially free from friction in order that no frictional torques may be imparted to the gyroscope. It is also important that the support scheme for the gyroscope be relatively simple and susceptible of mass production by standard techniques in order that the gyroscope may be used in expendable equipment. Finally, the support scheme for the gyroscope must be of such a nature that it may be assembled quickly by the use of unskilled or semi-skilled labor, and fabricated readily on automatic or semi-automatic machinery.

It is an object of this invention to provide a device for supporting a gyroscope or other mass for a single degree of angular freedom.

It is a further object of this invention to provide means for supporting a gyroscope substantially without friction about a single rotational axis.

It is a further object of this invention to provide a gyroscope support which is relatively simple to fabricate and adjust.

It is a further object of this invention to provide a single degree of freedom mass support which requires a minimum of adjustment upon assembly.

It is a further object of this invention to provide a single degree of angular freedom mass support which is relatively rigid but free from friction.

It is a further object of this invention to provide a single degree of angular freedom mass support which may be made easily and cheaply.

It is a further object of this invention to provide a single degree of angular freedom support for any mass, which support requires a minimum of alignment adjustment upon assembly.

Other objects of invention will become apparent from the following description taken in connection with the accompanying drawings, in which Fig. 1 is a sectional view of the invention; and Fig. 2 is a detailed sectional view of a typical orifice of the invention.

Referring to Fig. 1, a mass 1, which may be a gyroscope or other mass to be supported with a single degree of angular freedom, is glued or otherwise rigidly attached to adapter plates 2 and 3 having inside surfaces shaped to fit mass 1. Hemispheres 4 and 5, likewise, are glued to plates 33 and 34, which are circular in shape to correspond with adapter plates 2 and 3. Plates 33 and 34 are kept in register with adapter plates 2 and 3 by indentations 35, as shown in Fig. 1. This arrangement allows for the accurate alignment of the spin and precession axes of a gyroscope, because plates 2 and 33, and 3 and 34, may be bolted together with bolts 36, as shown, and then spheres 4 and 5 may be glued to the surfaces of plates 33 and 34 in the exact desired position. Later, bolts 36 may be removed for convenient disassembly of the bearing; and when plate 33 is again placed in register with adapter plate 2, the bearing will be as exactly aligned as it was originally.

A rigid frame 6 supports shell members 7 and 8, which are especially constructed so as to fit intimately against spheres 4 and 5 only along a zone of said spheres. This zone is chosen, and said shells are so constructed that the parallel planes defining the zones are normal to a line joining the centers of spheres 4 and 5; and also, of course, normal to the intended axis of rotation of mass 1. Air under pressure is furnished to the zonal areas between spheres 4 and 5 and shells 7 and 8 by means of small air conduits 9, 10, 11, 12, 13, 14 and 15 drilled symmetrically in shells 7 and 8 and shown typically in Fig. 2. Fittings 16 and 17 are attached rigidly to frame 6 and fit against shells 7 and 8 leaving annular air chambers 18 and 19, which receive air under pressure from ports 20 and 21 drilled in fittings 16 and 17. The joints between fittings 16 and 17 and shells 7 and 8 are sealed by means of compressible toroidal "O" rings 24, 25, 26 and 27 of conventional type. Air is furnished to ports 20 and 21 from conduits 30 and 31 in turn fed from any conventional source of compressed air such as motor driven compressor 32 shown schematically at reduced scale in Fig. 1.

Spheres 4 and 5 may conveniently be machined on automatic machinery out of metal, quartz or glass. Because all of the critical surfaces of shells 7 and 8 and spheres 4 and 5 are spherical, these may be easily ground and accurately lapped on automatic or semi-automatic machinery. The bearing may, therefore, be made relatively easily and cheaply. The gap between shells 7 and 8 and spheres 4 and 5, respectively, is of the order of .0005 inch, and air is supplied at a pressure of the order of 80 pounds per square inch. It can be seen from Fig. 1 that if frame 6 and its rigidly attached shell members 7 and 8 are unsymmetrical about the intended axis of rotation of mass 1, no angular shifting of shell 7 and 8 is required because the inside surfaces of shell 7 and 8, which mate with spheres 4 and 5, are spherical and the zone of contact between spheres 4 and 5 and shells 7 and 8 is sufficiently removed from a diameter of the spheres that small adjustments in position of the resultant axis of rotation of mass 1 may be made without realigning shells 7 and 8 in either plane. Because spheres 4 and 5 are truly spherical, they may be readily constructed of materials which are known for their rigidity and dimensional stability, such as quartz or glass. The bearing, therefore, can be made to be extremely rigid in supporting mass 1 against translation while allowing complete angular freedom about the axis of rotation of the bearing without friction. The use of quartz as material for spheres 4 and 5 is particularly advantageous in addition to its dimensional stability, because it resists scoring due to dirt particles; because it is non-magnetic; because it is of low density; and because it has a low temperature coefficient of expansion. The latter quality makes it desirable for use in contact with Invar, of which many gyroscopes and gyroscope casings of high precision are made.

In Fig. 2 there is shown in detail one of the orifices such as are shown at 9, 10, 11, 12, 13, 14 and 15 in Fig. 1. A hollow cylindrical jewel 28 is press fit into orifice 9 (for example) as shown in Fig. 2, leaving chamber 29 in the end of the orifice. No air is allowed to escape from the orifice, therefore, unless it first passes through the tiny hole along the cylindrical axis of the jewel. The purpose of this arrangement becomes apparent if a slight sidewise displacement of ball 4 in shell 7 is assumed. The orifices on the side toward which the displacement occurs will be effectively closed, allowing pressure in chamber 29 and the adjacent area to build up to full static pressure as it exists outboard of jewel 28. But on the side of shell 7 away from which the assumed small displacement occurred, no corresponding change in pressure is apparent because of the metering action of the jewels. Sphere 4, therefore, tends to be restored to a neutral centered position with respect to the shell; and both spheres are kept in centered position in their respective shells at all times. The importance of chambers 29 and the surrounding zonal areas in this regard cannot be overemphasized, because therein occurs the pressure change in response to movement of the spheres, which is responsible for restoring the spheres to a central position in the aforesaid shells.

It is apparent from the foregoing discussion that the orifices could also be of shapes other than cylindrical. For example, instead of having a series of cylindrical orifices in shell members 7 and 8, a similar array of slots could be used.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for supporting a mass for a single degree of angular freedom comprising two truncated spheres attached to opposite ends of said mass, two partial spherical shells whose internal surfaces are symmetrical about a line joining the centers of said spheres and whose internal surfaces mate with the surfaces of said spheres over a zonal region of each of said shells, the space between said spheres and said shells being arranged to exhaust to the atmosphere on both sides of said zonal region, a frame for holding said shells in fixed relationship to each other and in intimate contact with said spheres over said zonal regions, and means for furnishing air under controlled pressure to the space between said spheres and said shells at points along a circle on the internal surfaces of said spherical shells to establish a pressure gradient toward atmospheric pressure in both directions from said circle of points to thereby support said mass for a single degree of angular freedom with utilization of the full surfaces of said shells which are in contact with said truncated spheres.

2. A device as recited in claim 1 in which said means for furnishing air under pressure comprises compressor means for compressing air, a plurality of orifices drilled in said shells normal to the surfaces of said spheres, conduit means for distributing air from said compressor means to said orifices, and a hollow cylindrical jewel in each said orifice near but not flush with the inner surface of said shells whereby said spheres are kept centered in said shells.

3. Means for supporting a mass for a single degree of angular freedom comprising two truncated spheres attached to opposite ends of said mass, two partial spherical shells whose internal surfaces are symmetrical about a line joining the centers of said spheres and whose internal surfaces mate with the surfaces of said spheres over a zonal region of each of said shells, the space between said spheres and said shells being arranged to exhaust to the atmosphere on both sides of said zonal region, a frame for holding said shells in a fixed relationship to each other and in intimate association with said spheres over said zonal regions, and means for furnishing air under controlled pressure to the space between said spheres and said shells at points substantially along a circle on the internal surfaces of said spherical shells to establish a pressure gradient toward atmospheric pressure in both directions from said circle of points to thereby support said mass for a single degree of angular freedom with utilization of the full surfaces of said shells which are associated with said truncated spheres.

4. Means for supporting a mass for a single degree of angular freedom comprising two truncated spheres attached to opposite ends of said mass, two partial spherical shells whose internal surfaces are symmetrical about a line joining the centers of said spheres and whose internal surfaces mate with the surfaces of said spheres over a zonal region of each of said shells, the space between said spheres and said shells being arranged to exhaust to the atmosphere on both sides of said zonal region, a frame for holding said shells in a fixed relationship to each other and in intimate spacing with said spheres over said zonal regions, and means for furnishing air under controlled pressure to the space between said spheres and said shells at points in a substantially circular pattern along the internal surfaces of said spheres and said shells to establish a pressure gradient toward atmospheric pressure in both directions from said circular pattern of points to thereby support said mass for a single degree of angular freedom with utilization of the full surfaces of said shells which are in intimate spacing with said truncated spheres.

5. Means for supporting a mass for a single degree of angular freedom comprising two truncated spheres attached to opposite ends of said mass, two partial spherical shells whose internal surfaces are symmetrical about a line joining the centers of said spheres and whose surfaces mate with the surfaces of said spheres over a zonal region of each of said shells, the space between said spheres and said shells being arranged to exhaust to the atmosphere on both sides of said zonal region, a frame for holding said shells in close spacing with said spheres over said zonal regions, and means for furnishing air under controlled pressure to the space between said spheres and said shells at points along circles on the internal surfaces of said spherical shells to establish a pressure gradient toward atmospheric pressure in both directions from said circles of points to thereby support said mass for a single degree of angular freedom with utilization of the full surfaces of said shells which are in close spacing with said truncated spheres.

VERNON A. TAUSCHER.
JOHN M. SLATER.

REFERENCES CITED

The following references are of record in the file of this patent:

UNITED STATES PATENTS

| Number | Name | Date |
|---|---|---|
| 603,260 | Cook | May 3, 1898 |
| 1,630,318 | Tate | May 31, 1927 |
| 2,086,896 | Carter | July 13, 1937 |
| 2,161,241 | Bates | June 6, 1939 |
| 2,384,005 | Bell | Sept. 4, 1945 |
| 2,597,371 | Perkins | May 20, 1952 |